US012442973B2

(12) United States Patent
He et al.

(10) Patent No.: US 12,442,973 B2
(45) Date of Patent: Oct. 14, 2025

(54) DISPLAY MODULE AND DISPLAY DEVICE

(71) Applicant: Wistron Corporation, New Taipei (TW)

(72) Inventors: Ningbo He, New Taipei (TW); Ruihua Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 25 days.

(21) Appl. No.: 18/393,625

(22) Filed: Dec. 21, 2023

(65) Prior Publication Data
US 2025/0172742 A1 May 29, 2025

(30) Foreign Application Priority Data
Nov. 28, 2023 (CN) .......................... 202311611072.5

(51) Int. Cl.
*F21V 8/00* (2006.01)
(52) U.S. Cl.
CPC ......... *G02B 6/0073* (2013.01); *G02B 6/0055* (2013.01); *G02B 6/0078* (2013.01); *G02B 6/0088* (2013.01)
(58) Field of Classification Search
CPC .. G02B 6/0073; G02B 6/0055; G02B 6/0078; G02B 6/0088
See application file for complete search history.

(56) References Cited

U.S. PATENT DOCUMENTS

2011/0096528 A1* 4/2011 Kim ..................... G02B 6/0068
362/97.1

FOREIGN PATENT DOCUMENTS

| JP | 2009272251 | 11/2009 |
| TW | 200834176 | 8/2008 |
| TW | 201740170 | 11/2017 |
| WO | 2017106124 | 6/2017 |

OTHER PUBLICATIONS

Nishio, JP2007122971, May 2007 (Year: 2007).*
Nishimura, JP2009272251, Nov. 2009 (Year: 2009).*
Gollier, WO2017106124, Jun. 2017 (Year: 2017).*

* cited by examiner

*Primary Examiner* — Mary Ellen Bowman
(74) *Attorney, Agent, or Firm* — JCIPRNET

(57) ABSTRACT

A display module includes a plurality of light guide plates and a light source. Each of the light guide plates has an incident plane and an exit plane. An accommodating space is formed by surrounding the incident planes of adjacent light guide plates of the light guide plates. The light source is disposed in the accommodating space and is used to emit a light beam to each of the incident planes. The light beam enters each of the light guide plates through each of the incident planes and exits through each of the exit planes. A display device having the display module is also provided.

22 Claims, 13 Drawing Sheets

DISPLAY MODULE AND DISPLAY DEVICE

CROSS-REFERENCE TO RELATED APPLICATION

This application claims the priority benefit of China application serial no. 202311611072.5, filed on Nov. 28, 2023. The entirety of the above-mentioned patent application is hereby incorporated by reference herein and made a part of this specification.

BACKGROUND

Technical Field

The invention relates to a display module and a display device, and in particular to a display module capable of local dimming and a display device having the same.

Description of Related Art

Generally, mini-light-emitting diode (mini-LED) displays with a function of local dimming is able to control the light-emitting diodes in each area of the backlight module separately, so that the luminance of the light-emitting diodes in different areas can be controlled separately, thereby enhancing image contrast and reducing the power required for backlight. However, most of such mini-light-emitting diode displays are thick, resulting in a poor aesthetic appearance, and have high manufacturing costs. There are also light-emitting diode displays with side-light type backlight modules on the market, where the light-emitting diodes are disposed on a side of the panel. Although such design helps reduce the thickness of the display, it does not have the function of local dimming, the image contrast is relatively low, and the power for backlight is high. Meanwhile, since the light-emitting diodes are located on the side of the panel, the frame on the side of light incidence is thick and thus resulting in a poor aesthetic appearance.

SUMMARY

The invention provides a display module, which is light and thin while having a function of local dimming.

A display module of the invention includes a plurality of light guide plates and a light source. Each of the light guide plates is provided with an incident plane and an exit plane. An accommodating space is formed by surrounding incident planes of adjacent light guide plates of the light guide plates. The light source is disposed in the accommodating space and is used to emit a light beam to each of the incident planes. The light beam enters each of the light guide plates through each of the incident planes and exits through each of the exit planes.

In an embodiment of the invention, the display module further includes a plurality of reflectors. Each of the reflectors has at least one reflective surface, and the light guide plates are respectively accommodated in the reflectors.

In an embodiment of the invention, each of the light guide plates has a rear plane opposite to the exit plane and a side plane adjacent to the incident plane. Each of the reflectors includes a bottom wall and a side wall connected to the bottom wall. The rear plane of each of the light guide plates faces the bottom wall of the corresponding reflector. The side plane of each of the light guide plates faces the side wall of the corresponding reflector.

In an embodiment of the invention, the reflector includes a plurality of side walls. A notch is formed by surrounding two adjacent side walls of the side walls and the bottom wall. The notch is aligned with the incident plane and communicates with the accommodating space.

In an embodiment of the invention, the rear plane of each of the light guide plates is provided with a plurality of dots, and sizes of the dots increase from the side plane to a central area of the rear plane.

In an embodiment of the invention, the display module further includes a substrate. The light source is disposed on the substrate. Each of the reflectors is provided with a hook. The hook is engaged with the substrate.

In an embodiment of the invention, the display module further includes a back plate. Each of the reflectors is provided with another hook. The another hook is engaged with the back plate. The substrate is locked to the back plate.

In an embodiment of the invention, the light source includes a light emitting element. The light emitting element faces the incident plane.

In an embodiment of the invention, a thickness of each of the light guide plates is greater than or equal to a height of the light emitting element.

In an embodiment of the invention, the light emitting element has a light emitting plane, and an area of the incident plane is larger than an area of the light emitting plane.

In an embodiment of the invention, the light emitting element has a light emitting plane, and the incident plane is parallel to the light emitting plane.

In an embodiment of the invention, the display module further includes a supporting element. The supporting element is disposed in the accommodating space. A height of the supporting element is greater than a height of the light emitting element.

In an embodiment of the invention, the light guide plate has a rear plane opposite to the exit plane. The rear plane has a plurality of dots.

In an embodiment of the invention, the display module further includes a plurality of accommodating spaces and a plurality of light sources. The light sources are respectively disposed in the accommodating spaces, and the light guide plates and the light sources are arranged in arrays.

A display device of the invention includes a display module, an optical film assembly and a panel. The display module includes a plurality of light guide plates and a light source. Each of the light guide plates is provided with an incident plane and an exit plane. An accommodating space is formed by surrounding incident planes of adjacent light guide plates of the light guide plates. The light source is disposed in the accommodating space and is used to emit a light beam to each of the incident planes. The light beam enters each of the light guide plates through each of the incident planes and exits through each of the exit planes. The optical film assembly is stacked on the display module. The exit plane faces the optical film assembly. The panel is stacked on the optical film assembly. The optical film assembly is located between the panel and the display module.

In an embodiment of the invention, the display device further includes a control unit. The control unit is disposed on the bottom plate and is used to control luminance of at least one of the light sources to be different from luminance of at least another one of the light sources.

Based on the above, in the display module of the invention, the light source is disposed in the accommodating space between the light guide plates, and the light beam emitted by the light source may enter each incident plane of each of the light guide plates and exit through each exit plane. Since the light source is located in the accommodating space between the light guide plates as mentioned above rather than on the rear planes of the light guide plates, the thickness of the display module may be effectively reduced, so that the display module is thin and light, has a nice aesthetic appearance and saves manufacturing costs. Meanwhile, the configuration of the invention is conducive to modular assembly, and when a plurality of light sources is respectively located in a plurality of accommodating spaces between the light guide plates, each of the light sources is suitable to be independently controlled to achieve local dimming, thereby enhancing image contrast and reducing the power for backlight.

DESCRIPTION OF THE EMBODIMENTS

Figure 1:
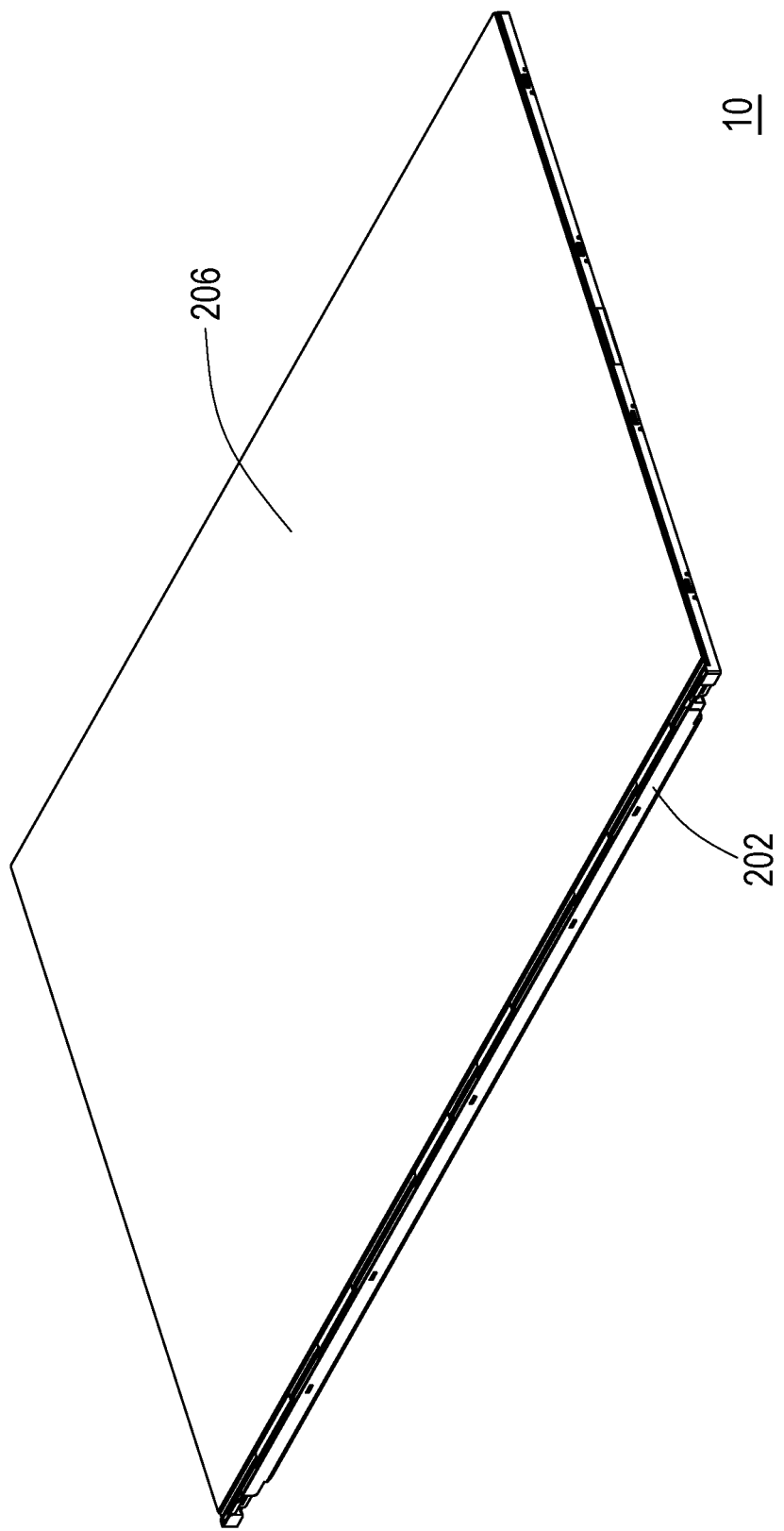
FIG. 1 is a schematic diagram of a display device according to an embodiment of the invention.
Figure 2:
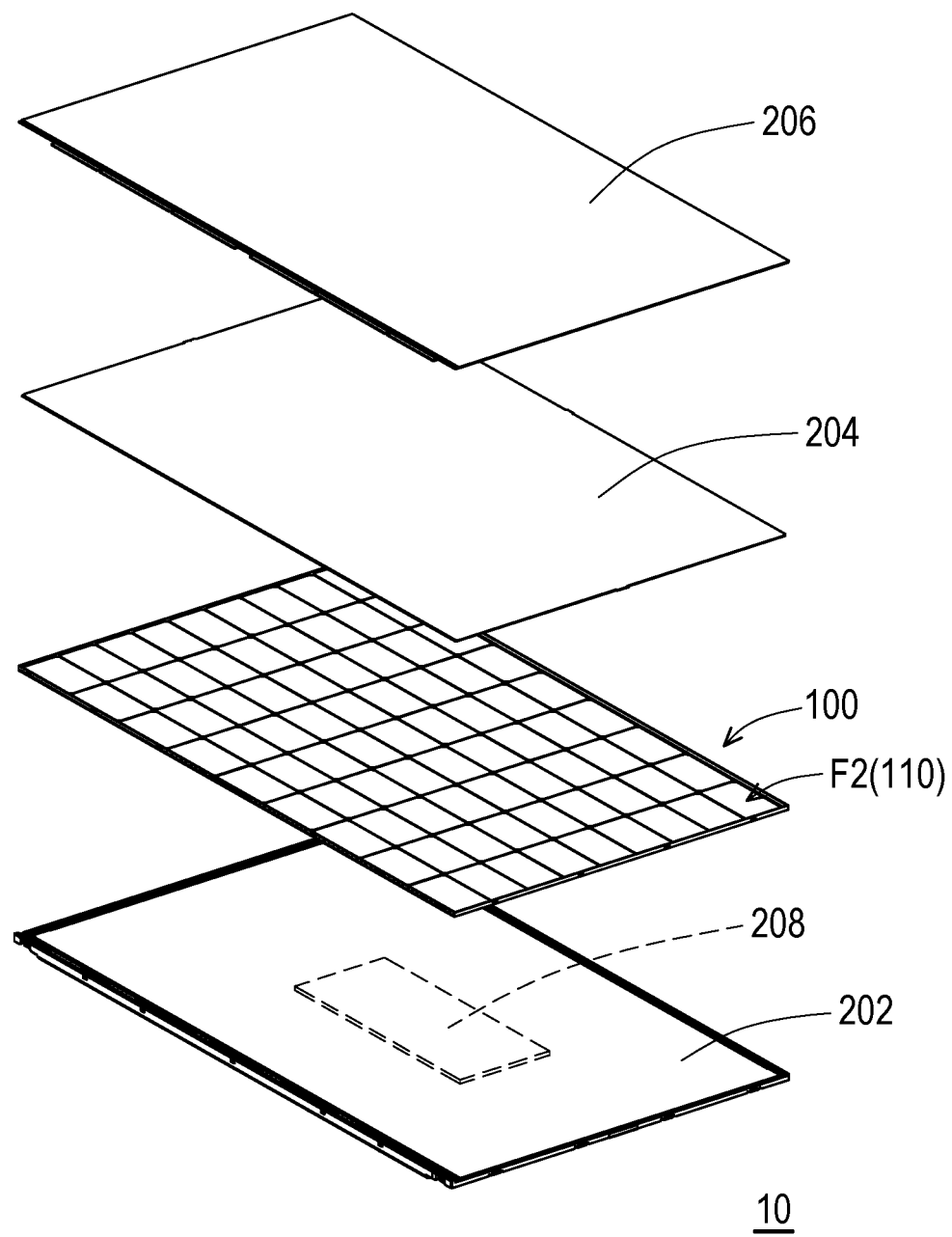
FIG. 2 is an exploded view of the display device of FIG. 1.

FIG. 1 is a schematic diagram of a display device according to an embodiment of the invention. FIG. 2 is an exploded view of the display device of FIG. 1. The control unit is shown with dashed lines in FIG. 2. Referring to FIG. 1 and FIG. 2, a display device 10 in this embodiment is, for example, a mini-light-emitting diode display with a function of local dimming, and includes a display module 100 (FIG. 2), a bottom plate 202, an optical film assembly 204 (FIG. 2), a panel 206 and a control unit 208 (FIG. 2).

In the embodiment, the display module 100 is disposed on the bottom plate 202, and the light beam emitted by the display module 100 may travel to the optical film assembly 204 and panel 206, so as to form a display screen. The optical film assembly 204 is stacked on the display module 100 and is located between the panel 206 and the display module 100, and may further diffuse the light beam from the display module 100, so as to allow uniform brightness. The panel 206 is, for example, a liquid crystal panel generally called an open cell (OC) panel and is stacked on the optical film assembly 204. The control unit 208 is disposed on the bottom plate 202 and is connected to the display module 100 to control the display module 100.

Figure 3:
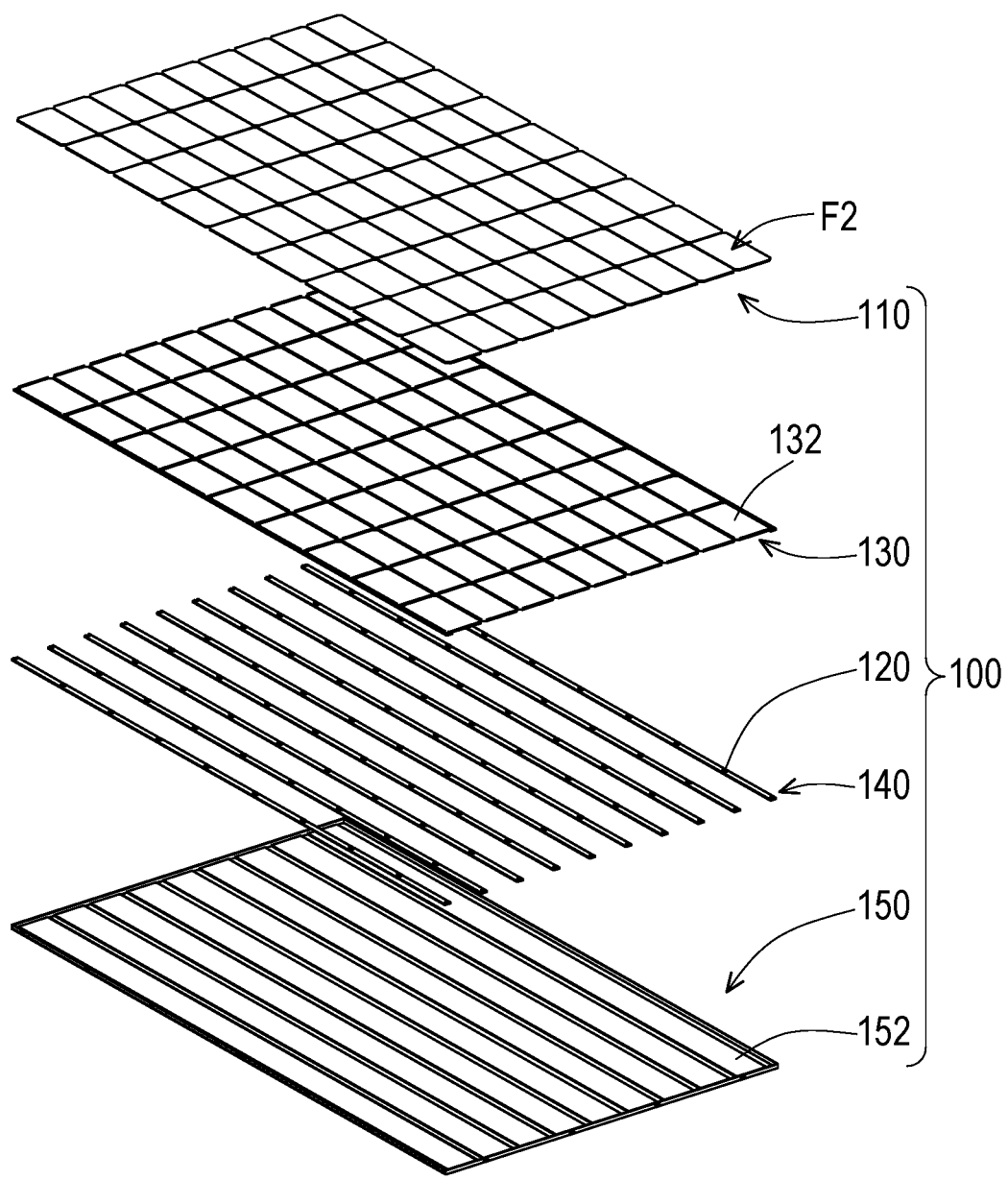
FIG. 3 is an exploded view of the display module of FIG. 2.
Figure 4A:
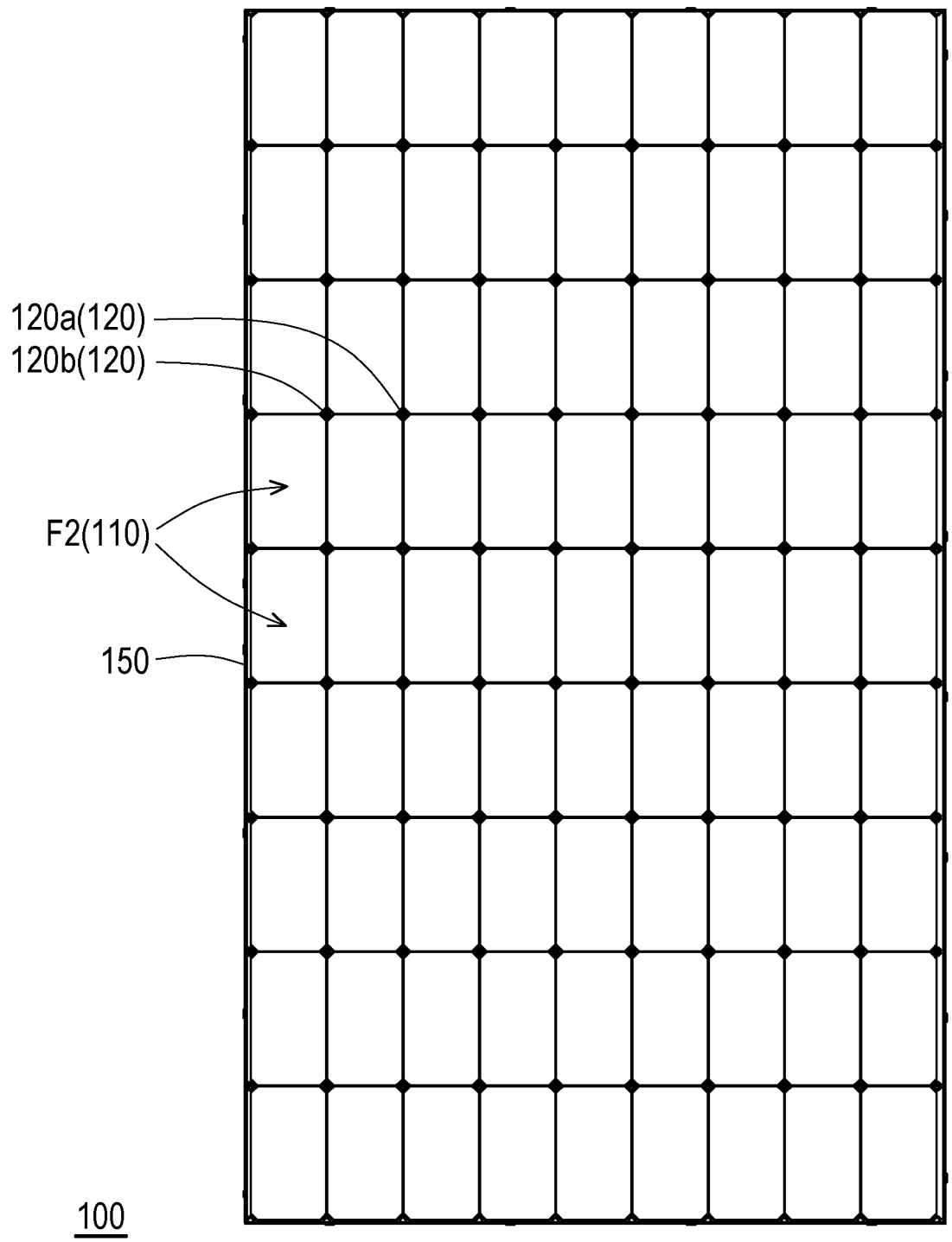
FIG. 4A is a top view of the display module of FIG. 2.
Figure 4B:
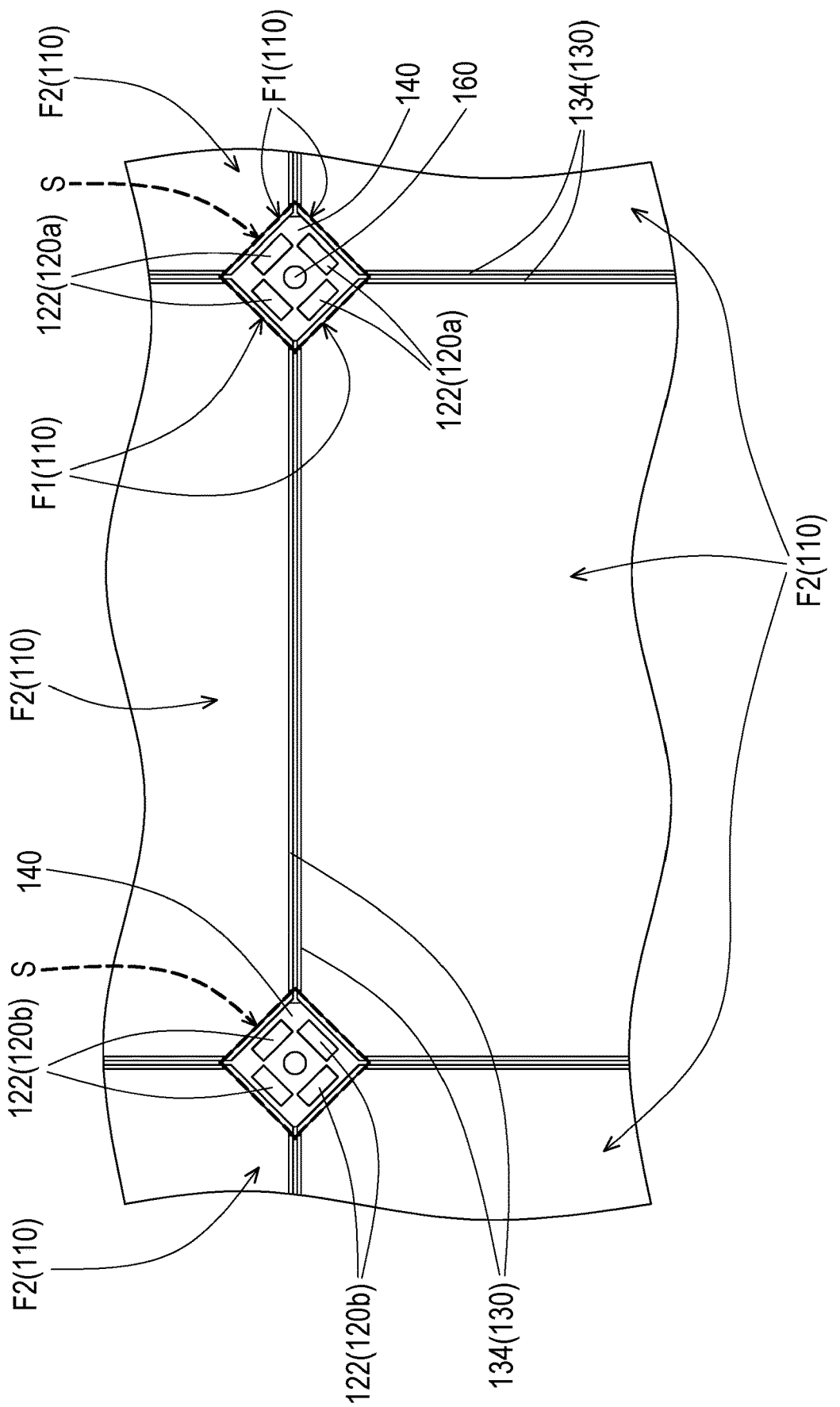
FIG. 4B is a partial enlarged view of the display module of FIG. 4A.

FIG. 3 is an exploded view of the display module of FIG. 2. FIG. 4A is a top view of the display module of FIG. 2. FIG. 4B is a partial enlarged view of the display module of FIG. 4A. The accommodating spaces S in FIG. 4B are shown with dashed lines. Referring to FIG. 3, FIG. 4A and FIG. 4B, specifically, the display module 100 includes a plurality of light guide plates 110 and a plurality of light sources 120. The light guide plates 110 and the light sources 120 are arranged in arrays as shown in FIG. 4A. Each of the light guide plates 110 is provided with at least one incident plane F1 (FIG. 4B) and an exit plane F2, and the exit plane F2 faces the optical film assembly 204 (FIG. 2). At least one accommodating space S is formed by surrounding the incident planes F1 of the adjacent light guide plates 110. The light source 120 is disposed in the accommodating space S and is used to emit light beams to each of the incident planes F1. The light beams enter each of the light guide plates 110 through each of the incident planes F1 and exit through each of the exit planes F2.

Since the light source 120 in the embodiment is disposed on the side of the light guide plate 110, the light beam emitted by the light source 120 enters the light guide plate 110 from the incident plane F1, and then exits through the exit plane F2. In other words, the light source 120 is located in the he accommodating space S between the light guide plates 110 instead of a rear plane 112 of the light guide plates 110, thereby effectively reducing the thickness of the display module 100 and allowing the display device 10 (FIG. 1) to be thin and light, have a nice aesthetic appearance, and reduce manufacturing costs.

Moreover, as shown in FIG. 4B, there are a plurality of accommodating spaces S and a plurality of light sources 120 in the embodiment, and the light sources 120 are respectively disposed in the accommodating spaces S. Given the configuration, the control unit 208 may control the luminance of at least one of the light sources 120 (such as the light source 120a in FIG. 4A and FIG. 4B) to be different from the luminance of at least another one of the light sources 120 (such as the light source 120b in FIG. 4A and FIG. 4B), thereby achieving the effect of local dimming, enhancing image contrast and reducing the power for backlight.

In addition, the light guide plates 110 and the light sources 120 are arranged in arrays in the embodiment; such design is conducive to modular assembly and may further save manufacturing costs. The specific structure of the display module 100 in the embodiment will be illustrated in detail below.

Figure 5:
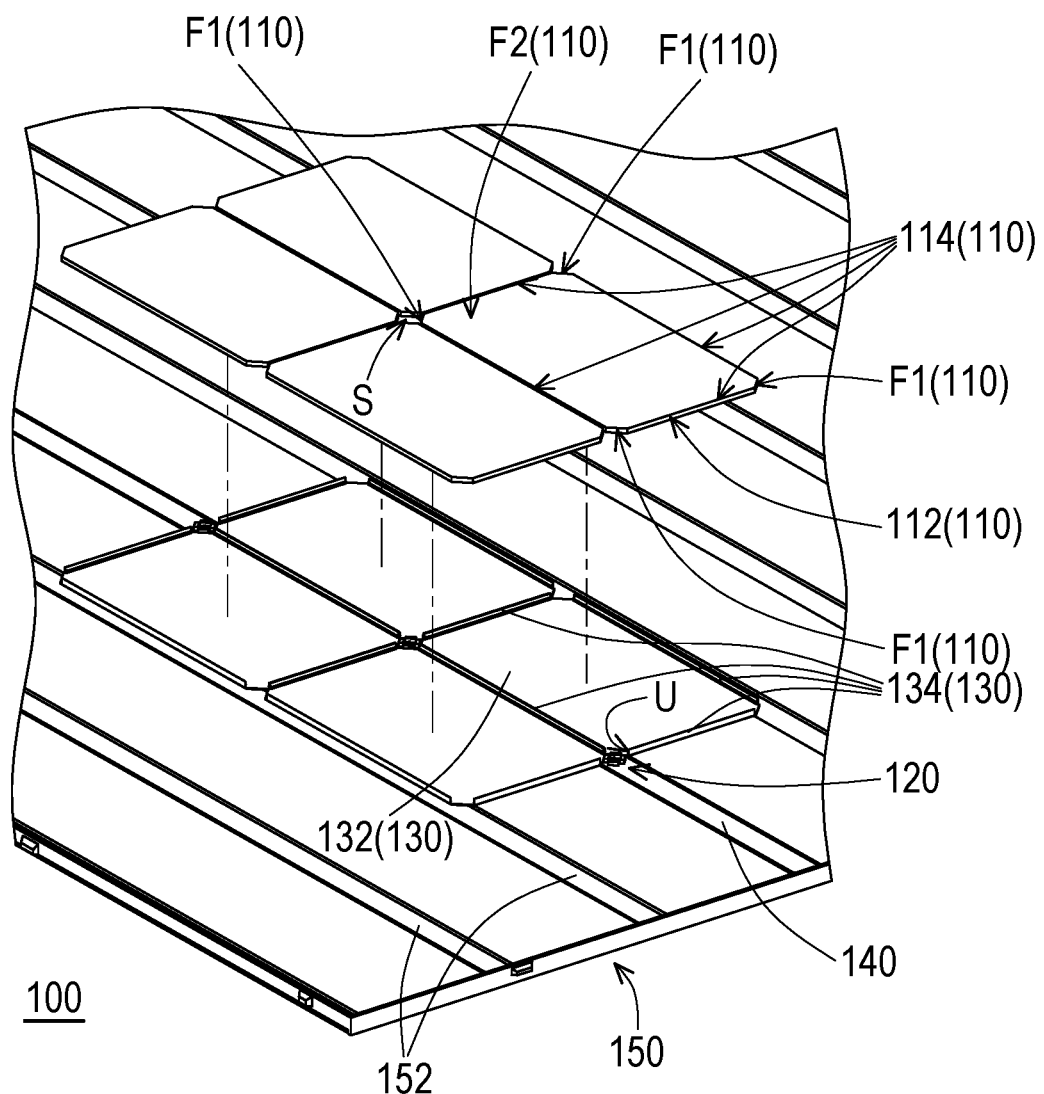
FIG. 5 is a partial perspective view of the display module of FIG. 4A.
Figure 6A:
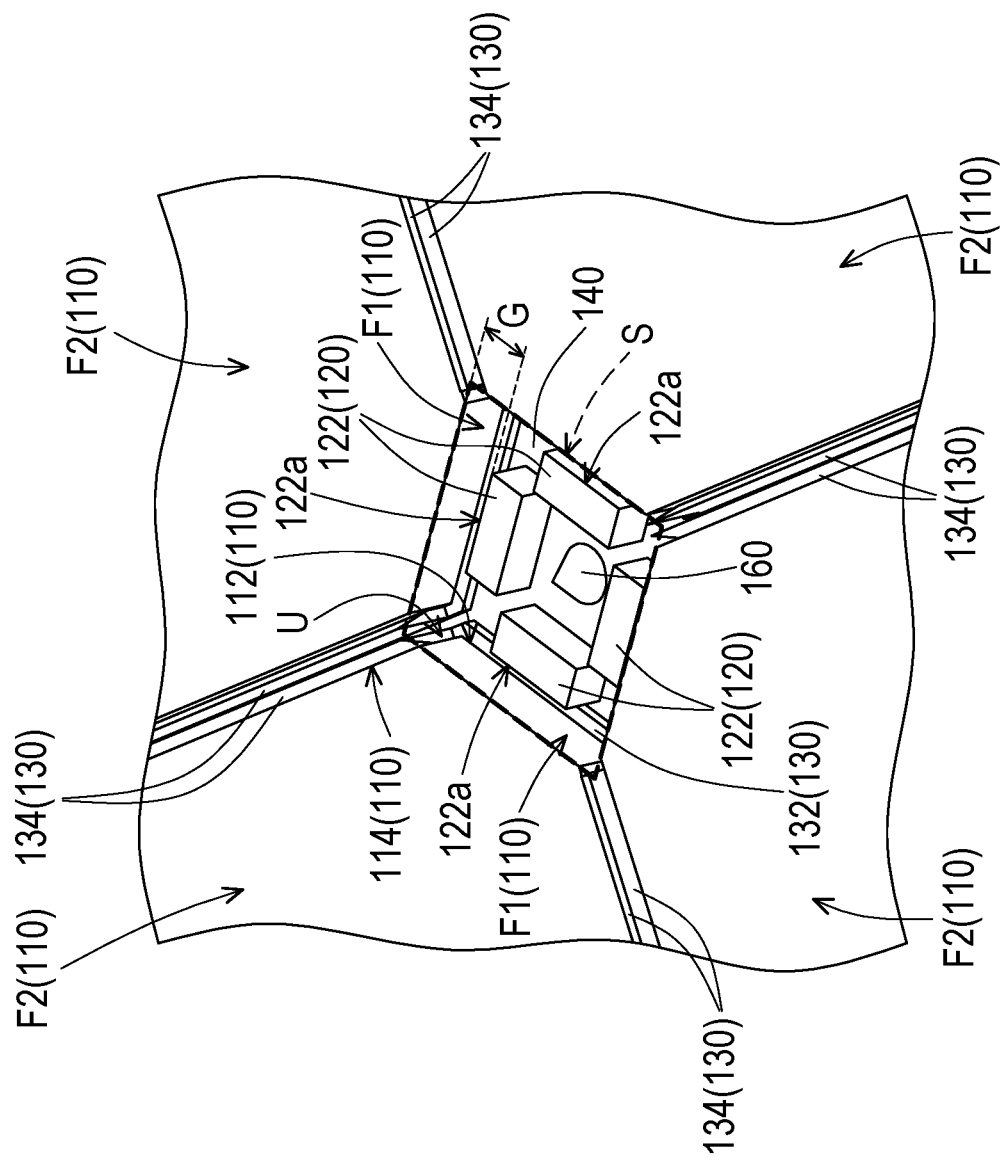
FIG. 6A is a partial enlarged view of the display module of FIG. 4A from another angle of view.

FIG. 5 is a partial perspective view of the display module of FIG. 4A. FIG. 6A is a partial enlarged view of the display module of FIG. 4A from another angle of view. It should be noted that, to clearly present the internal structure of the display module 100, the light guide plates 110 are shown as before being disposed on the reflector 130 in FIG. 5. In addition, for ease of explanation, only four light guide plates 110 and four reflectors 130 are shown in FIG. 5, while only one substrate 140 is shown. In addition, the accommodating space S in FIG. 6A is shown with dashed lines.

Referring to FIG. 5 and FIG. 6A, the back plate 150 is provided with a plurality of grooves 152 in the embodiment. The grooves 152 are recessed from the inner surface ((no reference numeral assigned) of the back plate 150 in a direction away from the reflector 130. The plurality of grooves 152 is used to accommodate the substrates 140, respectively. In the embodiment, the display module 100 further includes a plurality of reflectors 130 which respectively accommodates the light guide plates 110. Each of the reflectors 130 includes a bottom wall 132 and at least one side wall 134 connected to the bottom wall 132. The reflector 130 has at least one reflective surface. The reflective surface is, for example, made of a material of high reflectivity, and may be disposed on the bottom wall 132 and the side wall 134 to reflect the light beam entering the reflector 130. In addition, in the embodiment, the number of side walls 134 is plural (schematically shown as four in the drawing), and a notch U is formed by surrounding two adjacent side walls 134 and the bottom wall 132.

Moreover, in the embodiment, each of light guide plates 110 has a rear plane 112 opposite to the exit plane F2 and at least one side plane 114 (schematically shown as four in the drawing) adjacent to the incident plane F1. Each of the light guide plates 110 includes, for example, four side planes 114, and a quadrilateral is formed by surrounding the side planes 114. Each of the light guide plates 110 may include four incident planes F1, and the two sides of each of the incident planes F1 may be connected to two side planes 114, respectively. Each of the incident planes F1 may be located at the four corners of the light guide plate 110. Taking the four light guide plates 110 shown in FIG. 5 and FIG. 6A as an example, a rectangular area which is the accommodating space S is formed by surrounding the incident planes F1 of the adjacent light guide plates 110.

When each of the light guide plates 110 is disposed in the corresponding reflector 130, the rear plane 112 of each of the light guide plates 110 faces the corresponding bottom wall 132, and the side planes 114 of each of the light guide plates 110 face the corresponding side walls 134. Meanwhile, as shown in FIG. 6A, the notch U of the reflector 130 is aligned with the incident plane F1 and is connected to the accommodating space S, so that the light beam emitted by the light source 120 located in the accommodating space S enters the light guide plate 110 through the incident plane F1 without any blocking, providing good light incidence.

As shown in FIG. 6A, the light source 120 in the embodiment includes a plurality of light emitting elements 122 (schematically shown as four in the drawing). The light source 120 is disposed on the substrate 140. The light emitting elements 122 are, for example, mini-light-emitting diodes, each of which faces the corresponding incident plane F1 and having a light emitting plane 122a. Each of the light emitting elements 122 emits a light beam through the light emitting plane 122a. The light emitting plane 122a is parallel to the corresponding incident plane F1, and the area of the incident plane F1 is larger than the area of the light emitting plane 122a, so as to ensure the incident plane F1 to receive the full light beam produced by the light emitting element 122. Moreover, through the use of packaging processes, the light emitting element 122 may be designed to have only one light emitting plane 122a to prevent the light beam emitted by the single light emitting element 122 from entering a plurality of light guide plates 110 at the same time. In addition, there is a gap G between the light emitting plane 122a and the corresponding light guide plate 110, which may prevent the light emitting element 122 from colliding with the light guide plate 110 and being damaged.

After the light beam emitted by the light emitting element 122 passes through the incident plane F1 located on a side of the light guide plate 110, the reflective surface of the bottom wall 132 and the reflective surfaces of the side walls 134 in the reflector 130 may reflect the light beam towards the exit plane F2 of the light guide plate 110. After reflection, the light beam leaves the light guide plate 110 through the exit plane F2 and arrives at the optical film assembly 204 (FIG. 2) and the panel 206 (FIG. 2), thereby forming a display screen.

In other words, in the embodiment, the display module 100 applies a specific configuration among the light guide plate 110, the reflector 130 and the light emitting element 122, so that the light source 120 is able to be located in the accommodating space S between the light guide plates 110 as mentioned above rather than located on the rear plane 112 of the light guide plate 110. As such, compared to conventional mini-light-emitting diode displays with local dimming function, the invention effectively reduces device thickness, allows the display device 10 (FIG. 1) to be light and thin, enhances the aesthetic appearance and helps reduce manufacturing costs.

In addition, light-emitting diode displays with side-light type backlight modules do not generally have local dimming, and because their light sources are disposed on the frame of a display, the width and thickness of the frame are large and visually less attractive. In contrast, each of the light sources 120 in the embodiment is separate from each other, and the illuminance of each of the light sources 120 is controlled separately by the control unit 208 (FIG. 2). For example, four light emitting elements 122 may be controlled as a group to control and realize the function of local dimming, thereby improving image contrast and reducing the power consumption of the light source 120. Also, since the light source 120 in the embodiment is disposed in the accommodating space S between the light guide plates 110 instead of the frame of the display device 10, the size of the frame may be reduced, and even a frameless design may be achievable, thereby enhancing the aesthetic appearance.

Figure 6B:
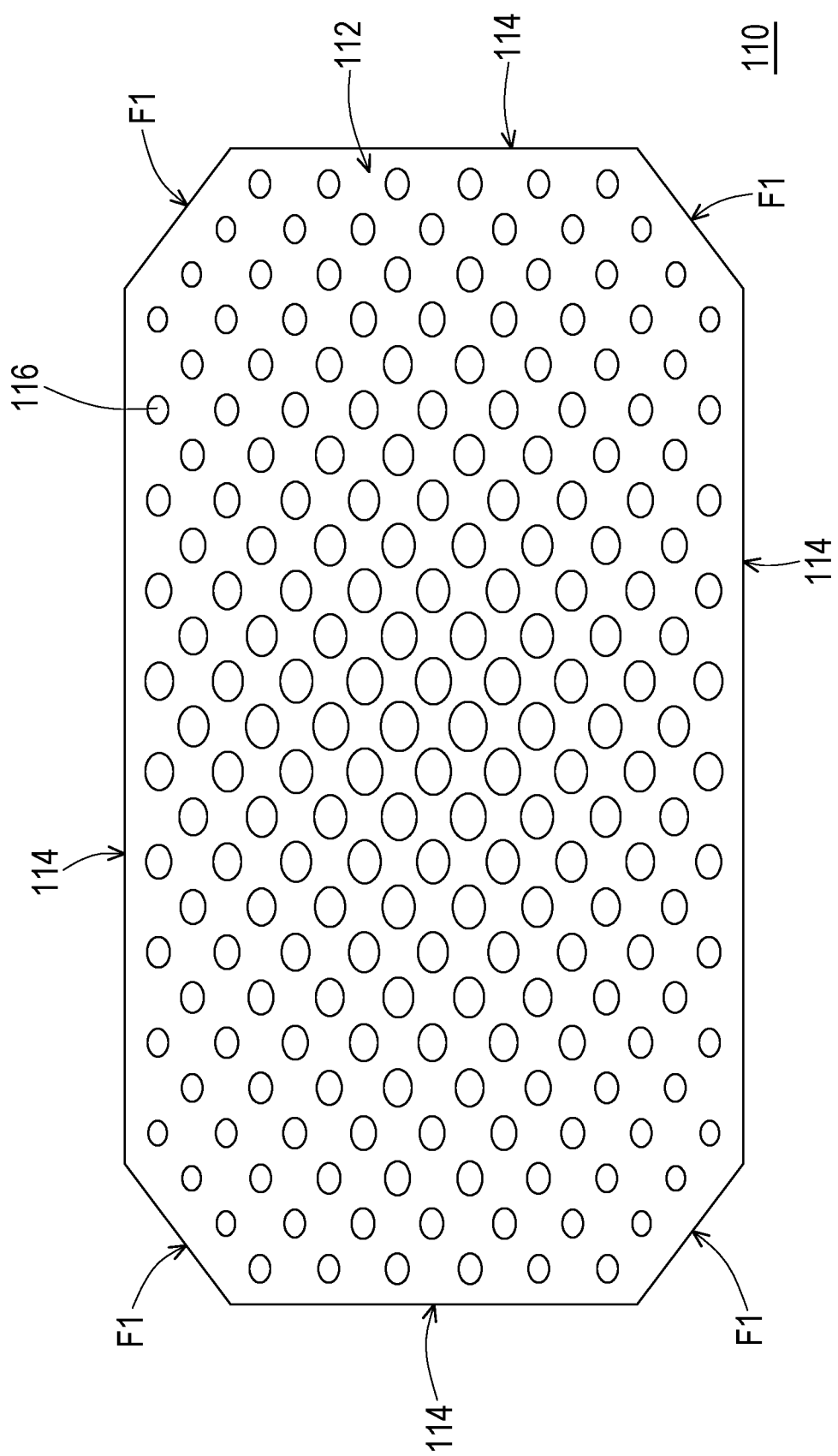
FIG. 6B is a schematic bottom view of the single light guide plate of FIG. 3.

FIG. 6B is a schematic bottom view of the single light guide plate of FIG. 3. Referring to FIG. 6B, in the embodiment, the rear plane 112 of the light guide plate 110 is provided with a plurality of dots 116 (i.e., surface microstructures). The dots 116 are ink-printed shapes, and the size of the dots gradually increases from the side plane 114 to the central area of the rear plane 112. The dots may increase the brightness uniformity of the light guide plate 110 up to 83% or more, for example, so as to allow more uniform brightness.

Figure 7:
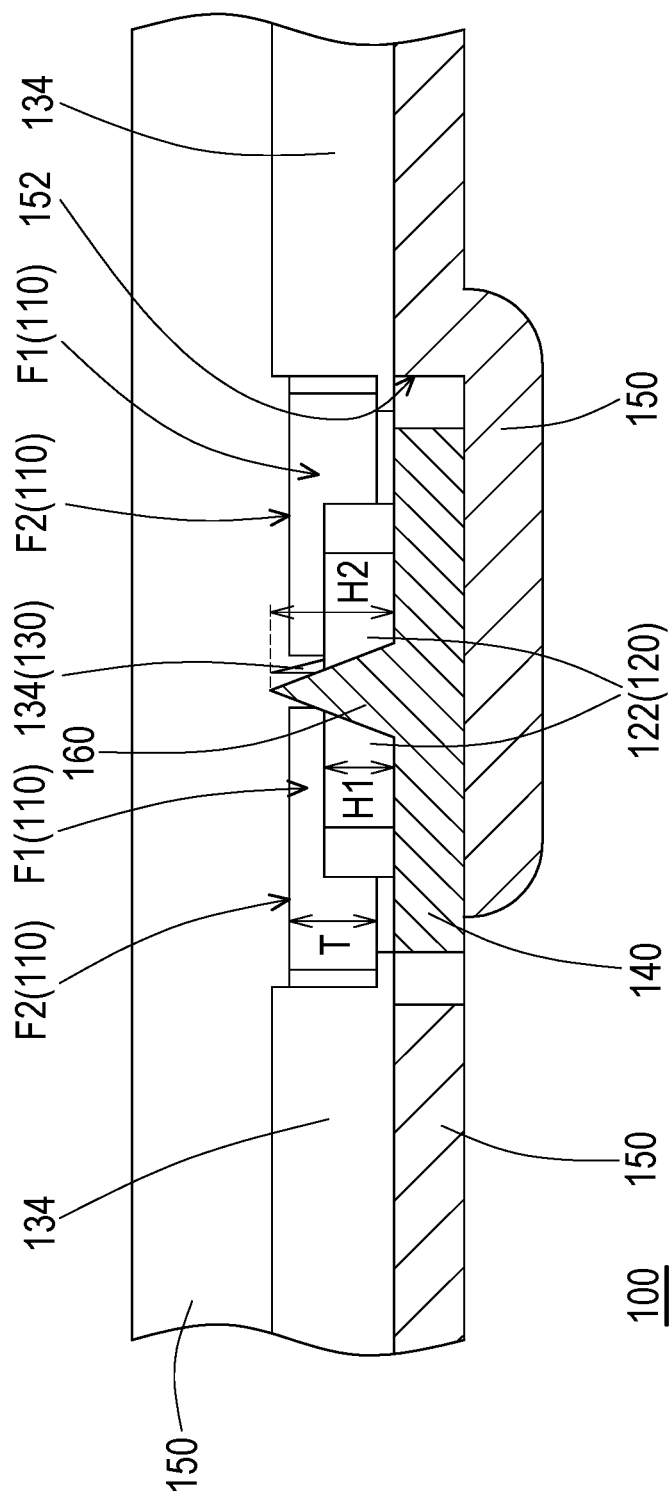
FIG. 7 is a partial cross-sectional view of the display module of FIG. 6A.

FIG. 7 is a partial cross-sectional view of the display module of FIG. 6A. Referring to FIG. 7, in the embodiment, the thickness T of each of the light guide plates 110 is greater than or equal to the height H1 of each of the light emitting elements 122, so that the light guide plate 110 may receive the light beam generated by the light emitting element 122 more. In addition, as shown in FIG. 6A and FIG. 7, the display module 100 in the embodiment further includes at least one supporting element 160. The supporting element 160 is disposed in the accommodating space S and is located between the light emitting elements 122. The height H2 of the supporting element 160 is greater than the height H1 of the light emitting element 122. The supporting element 160 is applied to support the optical film assembly 204 (FIG. 2) stacked on the display module 100 to prevent the optical film assembly 204 from colliding with or squeezing the light emitting element 122.

Figure 8A:
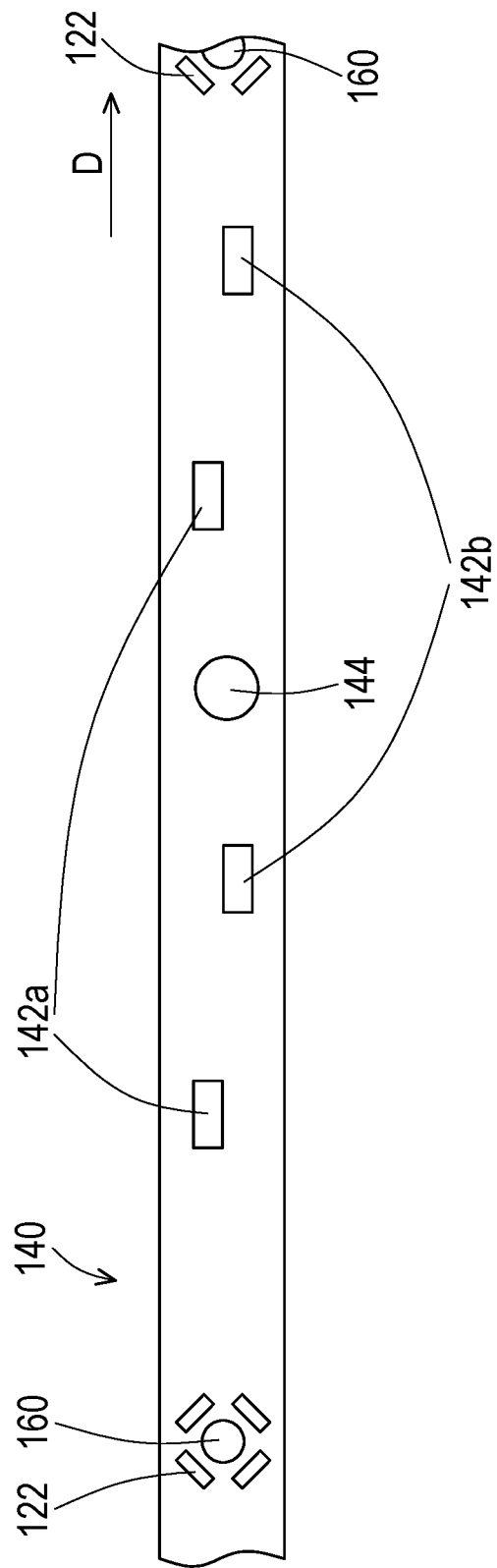
FIG. 8A is a partial top view of the substrate in FIG. 2.
Figure 8B:
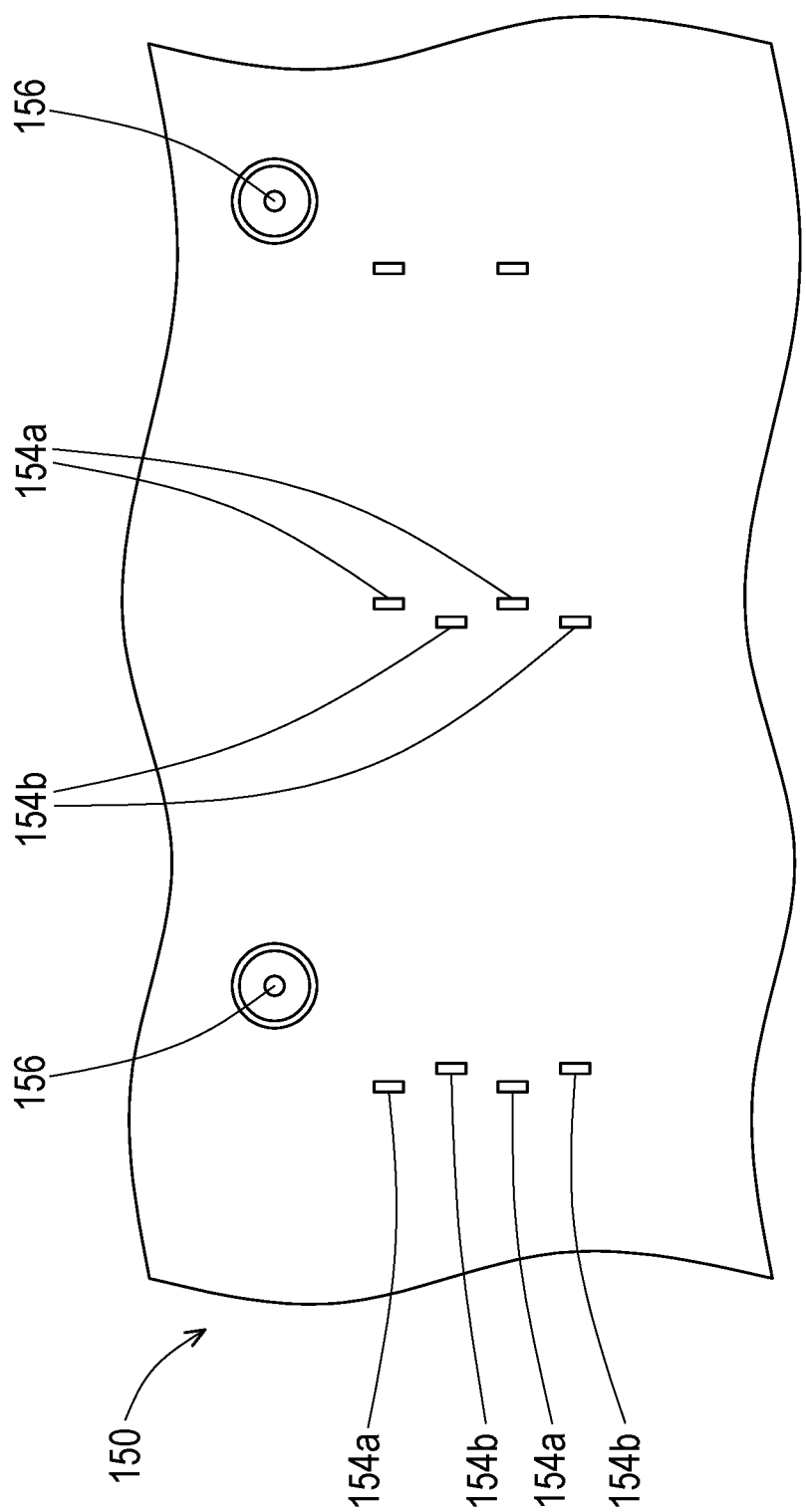
FIG. 8B is a partial top view of the back plate of FIG. 2.

Next, the assembly method of the display module 100 of the embodiment will be illustrated. FIG. 8A is a partial top view of the substrate in FIG. 2. FIG. 8B is a partial top view of the back plate of FIG. 2. Referring to FIG. 3, FIG. 5, FIG. 8A and FIG. 8B, in the embodiment, the display module 100 further includes at least one substrate 140 (schematically shown as plural in FIG. 3) and a back plate 150. The light sources 120 are disposed on the substrates 140. As shown in FIG. 8A, the light sources 120 are separately disposed on the substrate 140 along an extension direction D of the substrate 140, so as to facilitate the assembly of a plurality of light sources 120 to the back plate 150.

Referring to FIG. 8A and FIG. 8B, the substrate 140 includes at least one fastening hole 142a and 142b and at least one locking hole 144. The back plate 150 (FIG. 8B) includes at least one fastening hole 154a and 154b (FIG. 8B) and at least one locking portion. 156 (FIG. 8B). The substrate 140 may be fastened to the locking portion 156 of the back plate 150 by applying locking accessories such as screws that pass through the locking holes 144 of the substrate 140, so that the substrate 140 is securely disposed in the groove 152 of the back plate 150 as shown in FIG. 5.

Figure 8C:
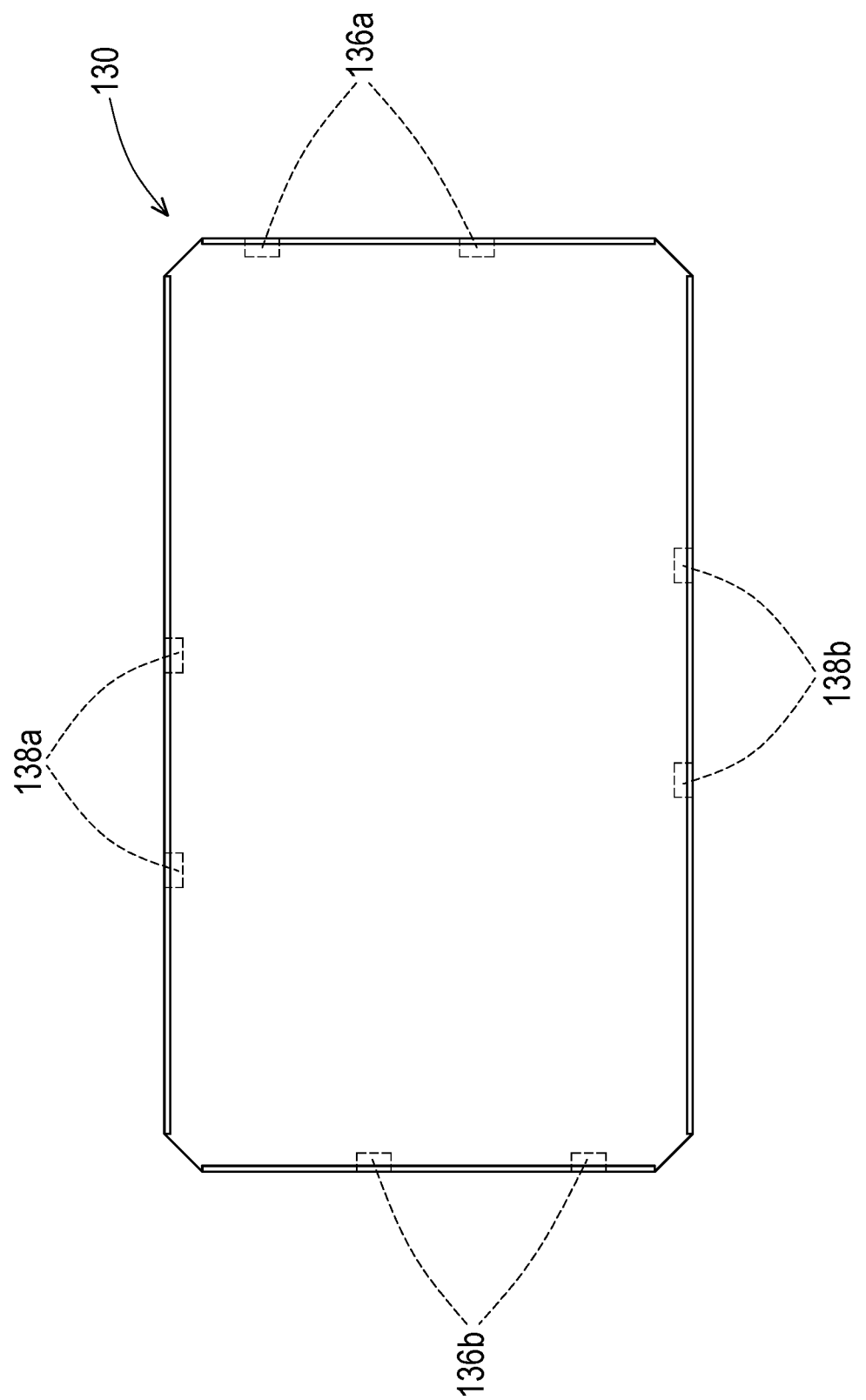
FIG. 8C is a top view of the reflector in FIG. 2.
Figure 8D:
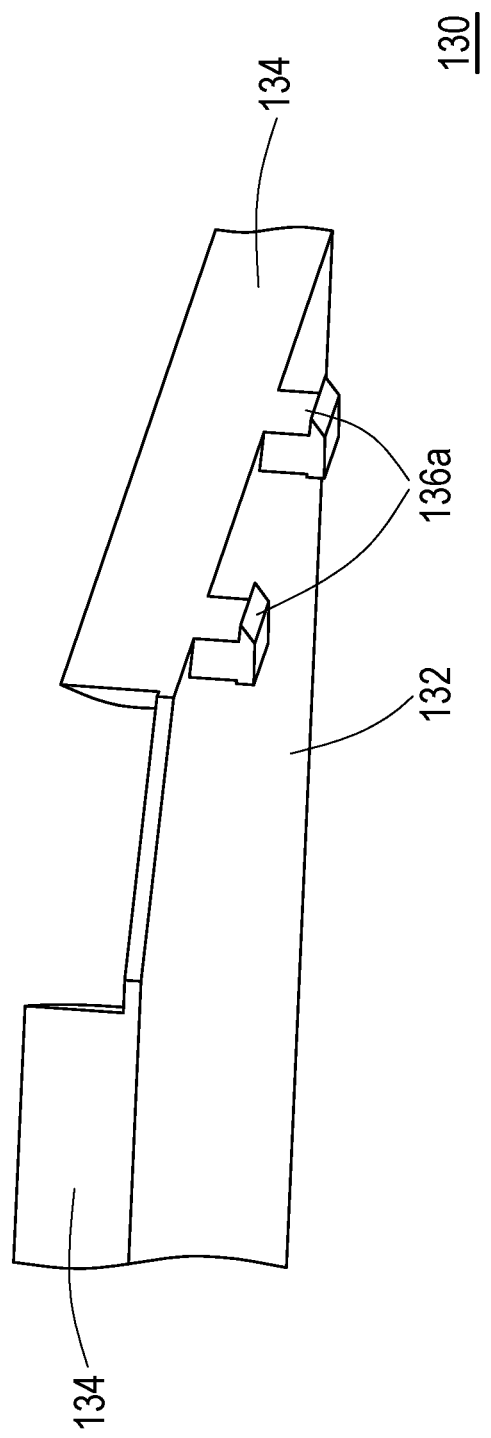
FIG. 8D is a partial perspective view of the reflector of FIG. 8C.

FIG. 8C is a top view of the reflector in FIG. 2. FIG. 8D is a partial perspective view of the reflector of FIG. 8C. Referring to FIG. 8A to FIG. 8D, in the embodiment, the reflector 130 (FIG. 8C) has a plurality of hooks 136a, 136b, 138a, and 138b (FIG. 8C) to secure the reflector 130 onto the substrate 140 and the back plate 150 (FIG. 8B).

Specifically, after the substrate 140 is disposed in the groove 152 of the back plate 150 as shown in FIG. 5, the hooks 138a and 138b of the reflector 130 may be respectively engaged with the corresponding fastening hole 142a of the substrate 140 and the corresponding fastening hole 142b of another substrate 140, and the hooks 136a and 136b of the reflector 130 may be respectively engaged with the corresponding fastening holes 154a and 154b of the back plate 150. For example, when the hooks 136a of the reflector 130 are engaged with the fastening holes 154a on the right side in FIG. 8B, the hooks 136b of the reflector 130 may be engaged with the fastening holes 154b on the left side of FIG. 8B. Thereby, the reflector 130 may be easily fixed on the substrate 140 and the back plate 150.

In summary, in the display module of the invention, the light source is disposed in the accommodating space between the light guide plates, and the light beam emitted by the light source may enter each incident plane of each of the light guide plates and exit through each exit plane. Since the light source is located in the accommodating space between the light guide plates as mentioned above rather than on the rear planes of the light guide plates, the thickness of the display module may be effectively reduced, so that the display module is thin and light, has a nice aesthetic appearance and saves manufacturing costs. Meanwhile, the configuration of the invention is conducive to modular assembly, and when a plurality of light sources is respectively located in a plurality of accommodating spaces between the light guide plates, each of the light sources is suitable to be independently controlled to achieve local dimming, thereby enhancing image contrast and reducing the power for backlight. In addition, since the light source is disposed in the accommodating space between the light guide plates instead of the frame, the size of the frame may be reduced, or even a frameless design may be achievable, thereby enhancing the aesthetic appearance.

What is claimed is:

1. A display module, comprising:
    a plurality of light guide plates, each of the light guide plates is provided with an incident plane and an exit plane, and an accommodating space is formed by surrounding incident planes of adjacent light guide plates of the light guide plates;
    a light source, disposed in the accommodating space and used to emit a light beam to each of the incident planes, wherein the light beam enters each of the light guide plates through each of the incident planes and exits through each of the exit planes;
    a plurality of reflectors, wherein each of the reflectors has at least one reflective surface, and the light guide plates are respectively accommodated in the reflectors;
    a substrate, wherein the light source is disposed on the substrate; and
    a back plate, comprising a groove, the substrate is disposed in the groove of the back plate,
    wherein a bottom wall of each of the plurality of reflectors directly contacts the back plate adjacent to the groove.

2. The display module according to claim 1, wherein each of the light guide plates has a rear plane opposite to the exit plane and a side plane adjacent to the incident plane, each of the reflectors comprises a side wall connected to the bottom wall, the rear plane of each of the light guide plates faces the bottom wall of the corresponding reflector, and the side plane of each of the light guide plates faces the side wall of the corresponding reflector.

3. The display module according to claim 2, wherein the reflector comprises a plurality of side walls, and a notch is formed by surrounding two adjacent side walls of the side walls and the bottom wall, and the notch is aligned with the incident plane and communicates with the accommodating space.

4. The display module according to claim 2, wherein the rear plane of each of the light guide plates is provided with a plurality of dots, and a size of each of the dots increases from the side plane to a central area of the rear plane.

5. The display module according to claim 1, wherein each of the reflectors is provided with a hook, and the hook is engaged with the substrate.

6. The display module according to claim 5, wherein each of the reflectors is provided with another hook, the another hook is engaged with the back plate, and the substrate is locked to the back plate.

7. The display module according to claim 1, wherein the light source comprises a light emitting element, and the light emitting element faces the incident plane.

8. The display module according to claim 7, wherein a thickness of each of the light guide plates is greater than or equal to a height of the light emitting element.

9. The display module according to claim 7, wherein the light emitting element has a light emitting plane, and an area of the incident plane is larger than an area of the light emitting plane.

10. The display module according to claim 7, wherein the light emitting element has a light emitting plane, and the incident plane is parallel to the light emitting plane.

11. The display module according to claim 7, further comprising a supporting element, wherein the supporting element is disposed in the accommodating space, and a height of the supporting element is greater than a height of the light emitting element.

12. The display module according to claim 1, wherein the light guide plate has a rear plane opposite to the exit plane, and the rear plane has a plurality of dots.

13. The display module according to claim 1, further comprising a plurality of accommodating spaces and a plurality of light sources, wherein the light sources are respectively disposed in the accommodating spaces, and the light guide plates and the light sources are arranged in arrays.

14. A display device, comprising:
    a display module, comprising:
        a plurality of light guide plates, each of the light guide plates is provided with an incident plane and an exit plane, and an accommodating space is formed by surrounding incident planes of adjacent light guide plates of the light guide plates;

a light source, disposed in the accommodating space and used to emit a light beam to each of the incident planes, wherein the light beam enters each of the light guide plates through each of the incident planes and exits through each of the exit planes;

a plurality of reflectors, wherein each of the reflectors has at least one reflective surface, and the light guide plates are respectively accommodated in the reflectors;

a substrate, wherein the light source is disposed on the substrate; and a back plate, comprising a groove, the substrate is disposed in the groove of the back plate, wherein a bottom wall of each of the plurality of reflectors directly contacts the back plate adjacent to the groove;

an optical film assembly, stacked on the display module, wherein the exit plane faces the optical film assembly; and a panel, stacked on the optical film assembly, wherein the optical film assembly is located between the panel and the display module.

15. The display device according to claim 14, wherein each of the light guide plates has a rear plane opposite to the exit plane and a side plane adjacent to the incident plane, each of the reflectors comprises a side wall connected to the bottom wall, the rear plane of each of the light guide plates faces the bottom wall of the corresponding reflector, and the side plane of each of the light guide plates faces the side wall of the corresponding reflector.

16. The display device according to claim 15, wherein the reflector comprises a plurality of side walls, and a notch is formed by surrounding two adjacent side walls of the side walls and the bottom wall, and the notch is aligned with the incident plane and communicates with the accommodating space.

17. The display device according to claim 15, wherein the rear plane of each of the light guide plates is provided with a plurality of dots, and a size of each of the dots increases from the side plane to a central area of the rear plane.

18. The display device according to claim 14, wherein each of the reflectors is provided with a hook, and the hook is engaged with the substrate.

19. The display device according to claim 18, wherein each of the reflectors is provided with another hook, the another hook is engaged with the back plate, and the substrate is locked to the back plate.

20. The display device according to claim 14, wherein the light source comprises a plurality of light emitting elements, and the plurality of light emitting elements face the incident plane.

21. The display device according to claim 14, further comprising a plurality of accommodating spaces and a plurality of light sources, wherein the light sources are respectively disposed in the accommodating spaces, and the light guide plates and the light sources are arranged in arrays.

22. The display device according to claim 21, further comprising a control unit, wherein the control unit is disposed on the bottom plate and is used to control luminance of at least one of the light sources to be different from luminance of at least another one of the light sources.

* * * * *